United States Patent Office 3,613,330
Patented Oct. 19, 1971

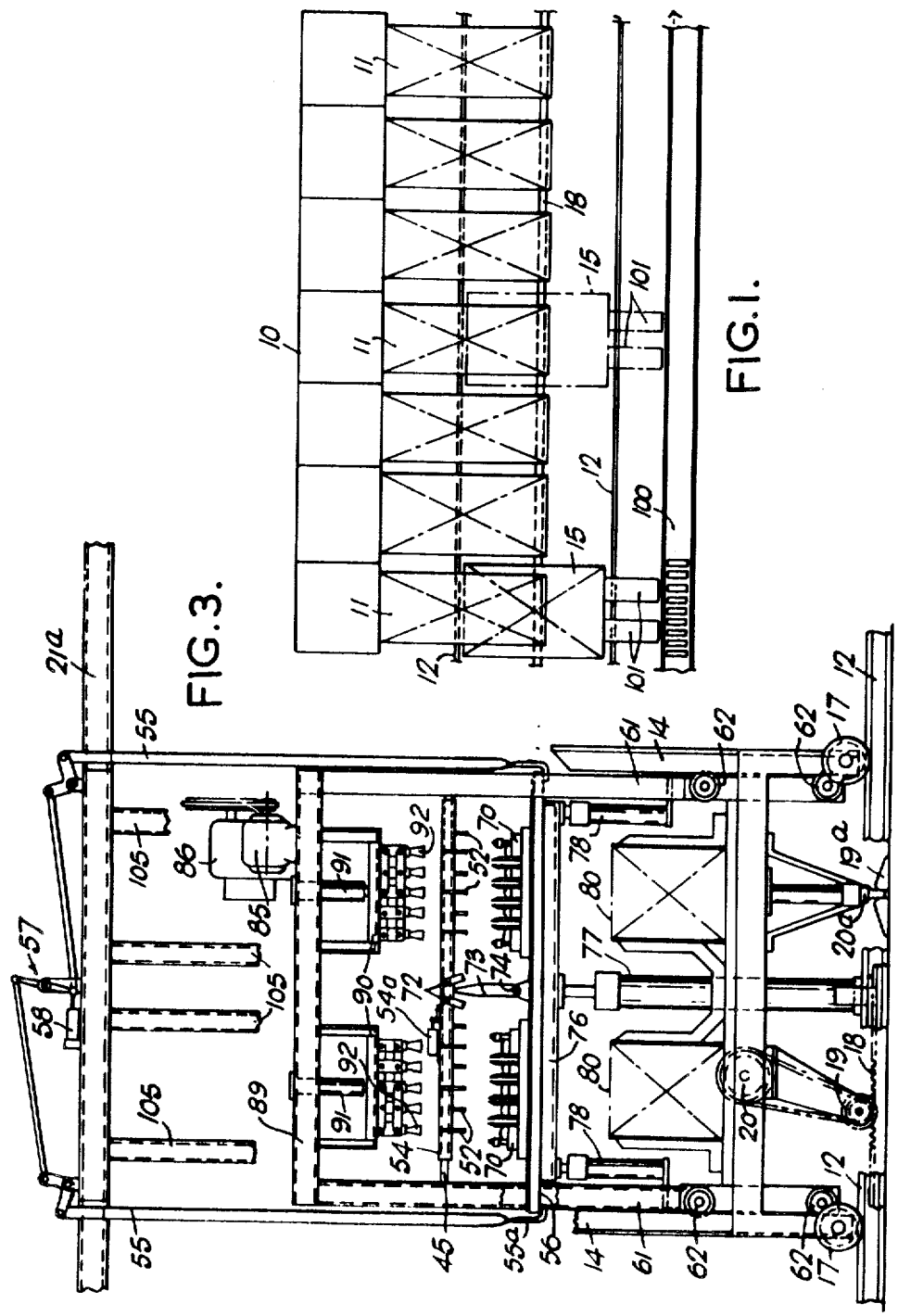

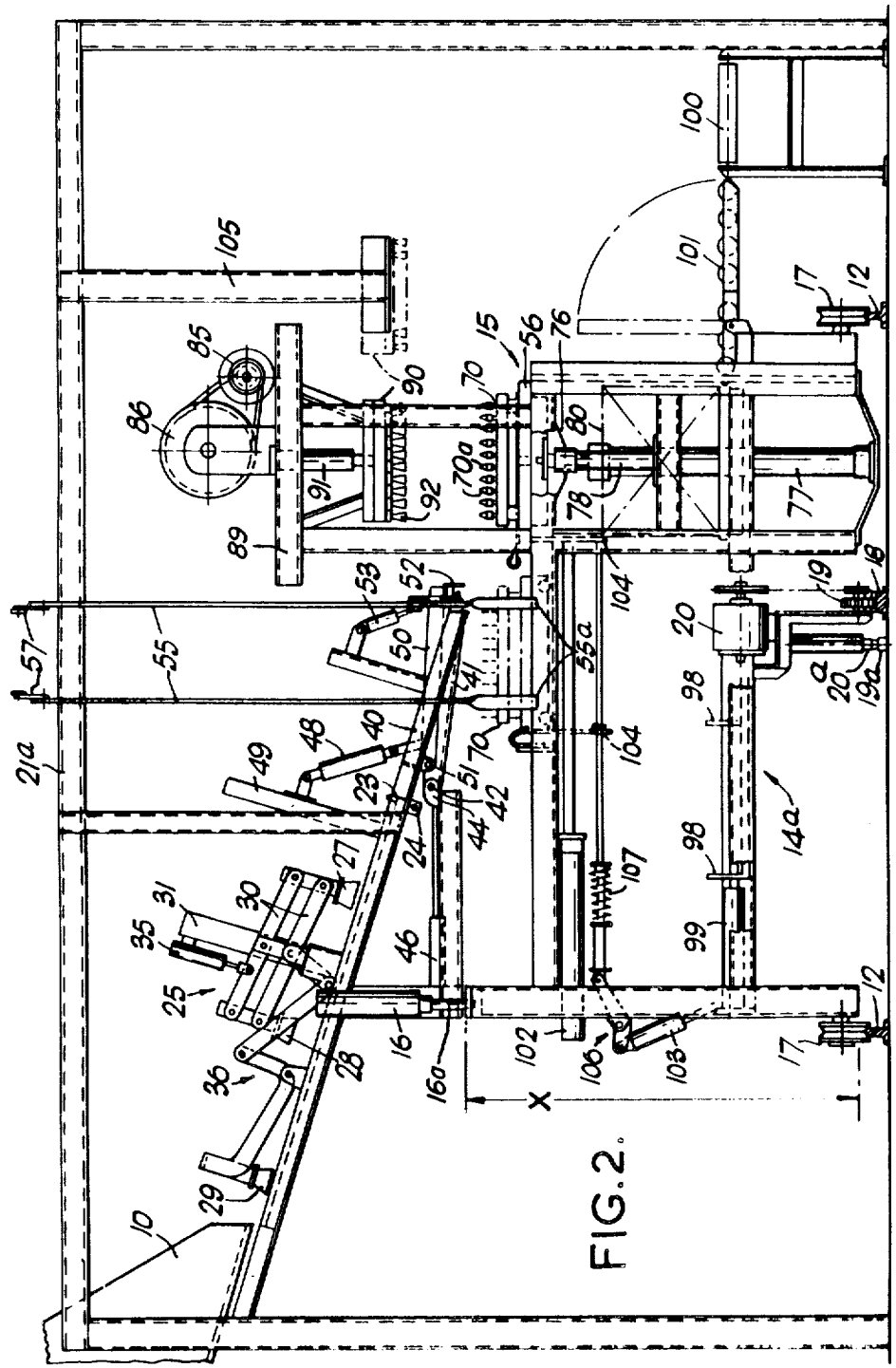

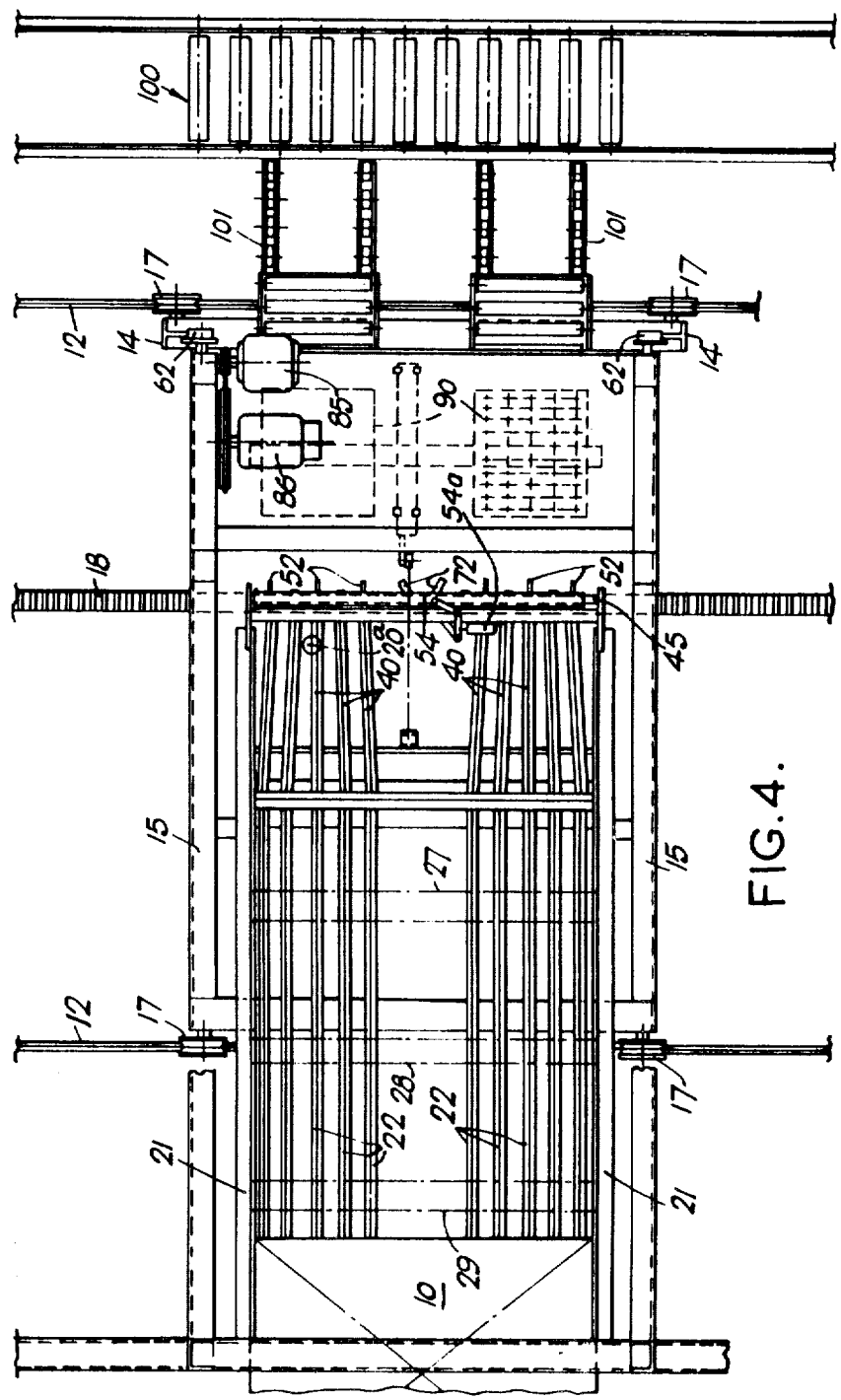

3,613,330
METHOD OF AND APPARATUS FOR PACKING BATCHES OF SIZED AND/OR GRADED FRUIT
Izak Johannes Voullaire, Monak, New South Wales, Australia (P.O. Box 543, Mildura, Victoria 3500, Australia)
Filed Sept. 11, 1969, Ser. No. 857,159
Claims priority, application Australia, Sept. 13, 1968, 43,356/68
Int. Cl. B65b 5/08, 35/38
U.S. Cl. 53—26      10 Claims

ABSTRACT OF THE DISCLOSURE

A method and apparatus for packing whole fruit such as oranges in a carton wherein a mobile packing station is arranged to co-operate individually with any one of a plurality of feed stations each of which receives fruit of a particular grade. Each feed station is arranged to form the fruit into a particular layer formation corresponding to the layers required in the carton and to deliver this preformed layer of fruit to the packing station. The packing station then deposits the layer into a carton.

---

This invention relates to a method and apparatus for packing fruit, particularly oranges, into a container, such as a cardboard carton or wooden case, for subsequent storage and/or transport.

At present, fruit such as oranges are graded in accordance with size, after the removal of defective fruit, and then packed in a standard size carton. The actual packing of the graded fruit into the cartons is always effected manually as there is no commercially available machine for effecting this operation. Although individuals do develop a high degree of skill in manually packing fruit, the output of any packing plant is solely dependent upon the skill of the packers, and the number of packers employed. Thus the speed and cost of packing fruit is at present largely dependent upon the labor force available, and the cost of labor.

Various mechanical aids have been proposed for the packing of fruit but for a number of reasons these machines have not been commercially produced. One reason for the absence of commercial fruit packing machines is the inability of any previously proposed machine to be conveniently adjusted to pack fruit of different grades.

In the packing of fruit in containers it is the practice to use a standard sized container for all grades of fruit, and to vary the formation and number of layers of fruit in the container for different grades, in order to ensure that the fruit is firmly packed in the container. Each layer of fruit is made up of a number of rows containing a given number of pieces of fruit, alternate rows being staggered relative to the other rows by an amount approximately equal to half the diameter of a piece of fruit of the particular grade. In addition, the corresponding rows of fruit in each layer are staggered by an amount of approximately equal to half the diameter of a piece of fruit in relation to the row immediately above and below it. This particular row formation is an accepted standard, and results in the voids between the pieces of fruit of one layer forming a seating for the pieces of fruit in the adjoining layer.

This arrangement of the rows and layers results in the fruit being packed firmly in the container to prevent movement of the fruit within the container during subsequent handling, and the elimination of any resultant damage to the fruit.

In order to employ a standard size carton for packing different grades of fruit, the number of rows and the number of pieces of fruit in each row, are varied in accordance with the grade. This variation in the layer formation of different grades of fruit means that with previously proposed mechanical packers, a separate packing machine would be required for each grade of fruit with a resultant large capital outlay. In addition the proportion of fruit of each particular grade produced may vary largely throughout a season, and from one season to another. Thus with the previously proposed packing machines, those machines for packing particular grades of fruit may be idle for considerable periods, while machines for other grades are overloaded.

It is therefore the principal object of the present invention to provide a method and apparatus which may be employed to effectively pack fruit of various grades and thus achieve maximum usage of the capital outlay.

With this object in view there is provided by the invention a method of packing pieces of whole fruit in a container comprising delivering graded fruit to each one of a plurality of fruit feeding stations, intermittently moving a fruit packing mechanism to stop in succession in co-operative relation at each fruit feeding stations, transferring a predetermined quantity of fruit from the co-operating feed station to the fruit packing mechanism to successively form layers of fruit of predetermined formation, and depositing a predetermined number of layers of fruit successively by the fruit packing mechanism into a container to fill the container.

More specifically there is provided a method of packing pieces of whole fruit in a container comprising delivering graded fruit to a plurality of feed stations each receiving fruit of one grade, forming at each feed station successive layers of fruit of a predetermined formation and sequence, moving a packing station on a predetermined path to successively co-operate with each feed station, feeding successive layers of fruit independently to the packing station from the co-operating feed station, and independently depositing each layer of fruit received by the packing station into a container, the operation of the packing station and co-operating feed station being coordinated to deposit the required number and sequence of layers to fill the container.

Conveniently each layer of fruit is formed by firstly arranging the fruit into a number of rows corresponding to the number of rows in the container, and then separating from each feed row the number of pieces of fruit in a corresponding row in the container. The separated fruit is then formed into the same number of rows with the fruit in each alternate row staggered relative to the remaining rows by a distance approximately half the diameter of one piece of fruit. This staggered row formation of fruit is then fed to the packing station and deposited in the container while maintaining the staggered row formation.

In order to reduce the effective time of each packing cycle, while one row of fruit is being fed to the packing station, the next layer is being formed in next feed station. Also while one layer is being placed in the container, the next layer is being fed from the feed station to the packing station.

There is also provided by the invention apparatus for packing pieces of whole fruit in a container comprising a plurality of fruit feeding stations arranged to receive fruit of respective grades, each fruit feeding station including a feed mechanism operable to separate predetermined numbers of pieces of fruit into row formation, and a mobile mechanism mounted for controlled movement in a defined path to co-operate in succession with each fruit feeding station, fruit transfer means operable to deliver the separated fruit from the feed mechanism to the packing mechanism to occupy a predetermined layer formation, and means to deposit the required number of layers of fruit in the container to fill the latter.

More specifically there is provided apparatus for packing pieces of whole fruit in a container, comprising a plurality of feed stations arranged in a fixed formation to receive fruit of respective grades, and a mobile packing mechanism mounted for movement in a defined path to successively co-operate with each feed station, each feed station including a feed mechanism arranged to successively deliver predetermined quantities of fruit to the co-operating packing station said packing mechanism including transfer means operable to individually receive the quantity of fruit from the feed mechanism and deliver said fruit in a predetermined layer formation to a packing head, and means to deposit the layer from the packing head in a container in said formation.

Conveniently the feed stations are disposed in a side by side relation and the packing mechanism is arranged to travel in a straight line in either direction from one feed station to the next. Preferably automatic stop means are provided to stop the packing mechanism in the correct operative relation to each feed mechanism as the packing mechanism advances from the adjoining feed station.

The above described method and apparatus enables a single packing mechanism to pack all grades of fruit, and thus avoid one of the major disadvantages of previously proposed mechanical packers which required completely independent machines for each grade. The provision of separate fixed feed stations for each grade of fruit, and the movable packing station enables the single packing station to be placed in operative relation with any feeding station in accordance with the quantity of a particular grade of fruit available for packing. Thus if the majority of fruit being processed is within two or three grades, then the packing station can be employed principally packing these grades, and only moved to the feeding stations of the other grades when sufficient fruit is available therein for packing. Thus the packing station is continually in use, and only the feed stations are periodically idle.

Also by providing a plurality of feed stations, one for each grade of fruit, these feed stations may be permanently set up to form the fruit into the particular layer formation for that grade of fruit and therefore no time is lost, when changing from the packing of one grade to another, in adjusting or altering the feeding mechanism to produce the desired layer formation.

The invention will be more readily understood from the following description of one practical arrangement of the fruit packing apparatus and of the method of operation of this apparatus.

In the drawings:

FIG. 1 is a schematical layout of the apparatus showing a plurality of feed stations and a single mobile packing station.

FIG. 2 is a side elevation with the packing station in operative relation to one feed station.

FIG. 3 is a front elevation of the apparatus principally depicting the packing station.

FIG. 4 is a plan of the packing station and one feed station as shown in FIG. 2.

Referring now to FIG. 1 the machine generally comprises seven hoppers 10, to receive fruit of different grades, mounted in a side by side relation with an independent feed station 11 extending forwardly and downwardly from the lower end of each hopper. Mounted on rails 12 extending in a direction transverse to the feeding stations, is packing station 15 which can be selectively positioned in operative relation to each feed station.

Pre-graded fruit is delivered to the hoppers 10 and each feed mechanism is arranged to deliver fruit in the required row formation, in accordance with its grade, to the packing station 15 for subsequent loading into cartons.

The operation of the various mechanisms on the feed stations 11 and the packing station 15 are pneumatically controlled to operate in the required sequence, and the automatic coupler 16 is provided to interconnect the air to the feed station and the packing station when the packing station is in the correct operative relation to any selected feed station.

The packing station 15 is mounted on wheels 17 which roll on the rails 12 fitted to the floor of packing shed. The rack 18 is parallel to the rails 12 and cooperates with the driving pinion 19, mounted on the frame of the packing station 11, and driven by the electric motor 20 also mounted on the packing station frame. Movement of the packing station is initiated by an operator actuated control, and is terminated automatically by the trip 20a co-operating with the cam 19a. As the trip 20a commences to rise on contacting the cam 19a the energy to the motor 20 is terminated. The momentum of the packing station continues the movement of the packing station until the trip 20a enters the recess of the cam 19a, whereby the packing station is stopped in correct alignment with the feed station.

The entry of the trip 20a into the cam recess also actuates the automatic coupler 16 to interconnect the air supply of the packing and feeding stations. The coupler 16 also includes the pin 16a which co-operates with an aperture in the frame of the packing station to assist the trip 20a in locking the packing station in correct alignment with the feed station.

In the arrangement illustrated the packing station packs two cartons simultaneously, and therefore each feed station has two feeding mechanisms which operate simultaneously. However it is to be understood that the packing station may be constructed to pack any desired number of cartons simultaneously, and the feed stations are similarly arranged. Also for simplicity the following description relates to only one of the feed and packing stations, but it is to be understood that the other stations are of identical construction and operation.

The fruit is packed in the carton in the row and layer formation as previously described and the number of pieces of fruit in each row and layer vary in accordance with the grade of fruit. In one typical example each layer of fruit in the carton comprises five rows of fruit in one direction and nine rows of fruit in the direction at right angles thereto with the fruit in adjoining rows in each direction staggered relative to the fruit in the next row. Accordingly the following description is in regard to a feed station and packing station constructed to handle this particular row formation, however it will be appreciated that the same principle of operation and construction can be used for any desired row formation.

Each feed station comprises a frame 21 supporting five parallel feed races 22 extending from the mouth of the hopper 10 at a downward inclination. At the lower end of each race 22 is a stop flap 23, all flaps being mounted on a common shaft 24. The flaps 23 may be pivoted from an upright position projecting into the race to prevent fruit from moving out of the lower end thereof, to a retracted position out of the race to permit the flow of fruit.

The flow control mechanism 25 is mounted above the races 22 upstream from the lower end of the races, to regulate the flow of fruit down the races. The mechanism includes three cross-bars 27, 28 and 29 having lower padded surfaces, which extend transversely across the races and are selectively brought into engagement with the fruit in the races to prevent movement thereof at spaced location down the races. The lower padded cross bar 27 is positioned a distance upwardly from the stop flaps 23 at the lower end of the race so as to engage the fifth piece of fruit from the stop flap in each race. The centre and upper crossbars 28 and 29 are spaced a further distance upstream so that each will engage the fifth piece of fruit upwardly from the preceding crossbar.

The lower and centre crossbars 27 and 28 are mounted on the parallel links 30 which are pivoted at their respective centres to the support 31. The air cylinder 35 is connected between the support 31 and links 30 to effect angular movement of the latter to selectively raise and lower crossbars 27 and 28. The upper crossbar 29 is carried and the linkage 36 mounted on the feed station frame 21 and connected to the parallel links 30 so that the lower and upper crossbars 27 and 29 are raised and lowered together.

The crossbars are actuated by the air cylinder 35 in sequence with the stop flaps 23 at the lower end of the races, so that when the stop flaps are raised to prevent the passage of fruit from the race the upper and lower crossbars 29 and 27 are raised clear of the fruit and the centre cross bar 28 is lowered to engage the fruit. With the crossbars so positioned the pieces of fruit between the centre and lower crossbars can flow down the race to be arrested by the stop flaps 23, and further fruit can flow down to the centre crossbar. When the stopflaps are retracted to permit the fruit to flow from the races the lower and upper crossbars 27 and 29 are lowered to engage the fruit and prevent further flows down the races to the stop flaps and from the hopper. At the same time the centre crossbar is raised so that fruit between the centre and rear crossbars can move to a position immediately upstream of the lower crossbar ready for subsequent flow down the races to the stop flaps 23. The control on the air supply to air cylinder 35 is arranged so that the crossbars complete two cycles each time the stop flaps 23 are raised in order to ensure that each race is maintained full of fruit between the stop flaps and the lower crossbar 27.

Extending forwardly and downwardly from each race 22 is the guide chute 40, with the five guide chutes for each series of five races mounted on the common frame 41. The chute frame extends rearwardly of the chutes 40 below the races 22, and is pivoted at 42 to the carrier 44 for angular movement about an axis transverse to the races. The carrier 44 is supported on the horizontal tracks 45 mounted on the feed frame 21 for reciprocating movement beneath the races.

The movement of the carrier 44 is effected by the air cylinder 46 connected between the carrier and the feed frame. The pivotal movement of the chute frame is controlled by the air cylinder 48 connected between the chute frame 41 and the pillar 49 on the feed frame 21. The arrangement of the chutes and the pivot axis of the chute frame is such that when the chute frame is pivoted to its lower extent the rearmost portion of the chute is below the level of the forward end of the races 22, so that when the carrier is withdrawn rearwardly the chutes may pass beneath the races.

The stop frame 50, pivotally mounted at 51 to the chute frame 41, extends forwardly to a position above the foremost ends of the chutes and carries a plurality of stop fingers 52, one in line with each chute 40. The stop fingers normally extend into the forward part of the chutes to prevent fruit discharging from the forward end of the chute, and the air cylinder 53 connected between the chute frame 41 and the stop frame 50 effect relative angular movement therebetween to raise and lower the stop fingers.

The air cylinders 48 and 53 are arranged to operate in sequence so that the frame 50 remains in position to prevent the discharge of fruit from the chutes until the chute frame has pivoted to its lowermost position. Also the air cylinders 53 and 46 are arranged to operate so that the stop frame 50 is raised to lift the finger 52 and permit the fruit to flow from the chutes, at the same time as the carrier 44 and chute frame 41 commence to retract below the races under the action of the cylinder 46. As the chute frame is drawn rearwardly the fruit rolls from the forward ends of the chutes and is deposited in rows on the assembly plate 70 which is described in detail hereinafter. After the assembly plate has moved forward into the packing station, as is described later, the chute frame is again moved forward, the stop frame lowered and the chute frame raised to align the chutes with the races 22 on the feed frame, to receive a further layer of fruit.

As previously explained the fruit in alternate rows in the carton is staggered by an amount approximately equal to half the diameter of a piece of fruit. This staggered row formation is initially imparted to the fruit in the chutes 40, by arranging the stop fingers 52 in a similarly staggered relation, as best seen in FIG. 4. Thus in each alternate chute the lowermost piece of fruit is displaced upstream half a fruit diameter from the lowermost piece of fruit in the other chutes.

Also as previously explained the row formation in each layer is the reverse of the immediately preceding layer. In order to achieve this change the stop fingers 52 are mounted on the square tube 54 axially slidable on the rod 45 secured to the chute frame 41, transversely of the chutes 40. The position of the fingers 52 is changed after each layer of fruit is delivered to the assembly plate 70 by operation of the air cylinder 54a in sequence with the movement of the chute frame 41.

Projecting downwardly from the overhead portion 21a of the feed frame, on either side of the chute frame, is a pair of table lift members 55 disposed so that the lower ends 55a thereof project below the table 56 carrying the assembly plates 70, when the assembly plates are positioned below the chute frame as shown in FIG. 2. These table lift members are suspended from the overhead link mechanism 57, incorporating the air cylinder 58, so that the table 56 and the assembly plates may be lifted from its support on the travelling packing station 15 and retained with the feed station 11, when the packing station moves to another feed station. This is necessary because as each feed station handling fruit of a different grade, a different arrangement and size of assembly plate is required for the packing of each grade of fruit.

The assembly plate 70 has projecting from the upper surface a plurality of fingers 70a, preferably formed of resilient material, arranged in rows to define receptacles for the pieces of fruit. The spacing of the fingers is such that the pieces of fruit are each received between four fingers arranged at the corners of a square having a diagonal dimension approximately equal to the diameter of the particular grade of fruit to be received. An example of the finger arrangement is to be found in the Australian Pat. No. 246,474.

The preferred form of assembly plate will be the subject of a further patent application. In this preferred assembly plate independent pairs of rows of fingers are provided for each row of fruit and the pairs of rows are laterally movable relative to one another. The pairs of rows are spaced apart to initially receive the fruit from the chutes 40, and then moved closer together before presenting the layer of fruit to the packing head.

The packing station 15 comprises a fabricated frame 14 of generally L shape with the leg section 14a projecting rearwardly below the feed station.

This rearwardly extending section 14a which projects to a height X above the rails 12, carries a feed mechanism of any suitable construction (not shown) to supply empty cartons 80 to a location beneath the packing heads 90. A separate carton feed is provided to each packing head, the cartons being loaded manually into the rear of guides with the reciprocating frame 98 being operated by the air cylinder 99 to feed the cartons forward in timed relation with the packing operation as later described. The feeding of the cartons also effect discharge of the packed cartons from the packing station via the transfer conveyor 101 to the delivery conveyor 100. The transfer conveyors 101 are pivoted upwardly clear of the delivery conveyor during movement of the packing station. When the carton is located below the packing head 90 it is supported on the frame 61 mounted for vertical sliding movement in frame 14 of the packing station, under the control of the air cylinder 77.

The table 56 upon which the assembly plates 70 are mounted is slidably supported in the packing station frame 14, and is reciprocated by the air cylinder 102 from a position beneath the chutes 40 in which they receive the fruit (shown in broken outline in FIG. 2), to a forward position beneath the packing heads 90. This movement of the table 56 is effected in sequence with the movement of the chutes 40 and packing heads 90 as described later. The table 56 is connected by the rod 104, spring 107 and linkage 106 to the shock absorber 103.

When the table 56 is positioned below the packing heads 90 it is located above the platform 76 which is vertically slidable in the frame 14 under the control of the air cylinders 78. Raising of the platform 76, table 56 and assembly plates 70, brings the fruit on the assembly plates into engagement with the plurality of suction cups 92 carried by the packing heads 90.

The construction and operation of the packing heads 90 is described in detail in Australian Pats Nos. 245,895 and 266,503 and therefore will not be further described at this time, however it will be noted that there are sufficient suction cups provided to cooperate with the fruit in each of the two alternate layer formations used in packing one carton. The supply of suction to these cups is controlled so that alternate arrangements of cups are successively energised to correspond with the arrangement of fruits presented by the plate assembly.

As previously described the position of the stop fingers 52 provided on the forward portion of the chute frame 41 to stop the fruit in the required relationship for delivery to the assembly plate 70, changes after the delivery of each layer of fruit, in order to obtain the required alternate layer formation. This change in the formation necessitates a similar change in the supply of suction to the array of suction cups. In order to keep these two factors in phase the tube 54 carrying the fingers 52 also carries cam members 72 disposed to co-operate with a trip lever 73 on the table 56 carrying the assembly plates. The arrangement is such that when the assembly plate 70 is withdrawn to a position below the chutes 22 to receive the fruit, the trip lever 73 is actuated by the cam member 72 and moved to a position corresponding to the position of the stop fingers 52. When the table 56 is again moved forward to a position below the packing heads 90, and the table raised to deliver the fruit to the suction cups, the trip lever 73 operates an appropriately positioned valve (not shown) so that the correct array of suction cups are connected to the suction source.

It will be understood from previous description that the number and position of the pieces of fruit in each layer varies with the grade of the fruit and accordingly a different packing head with the appropriate array of suction cups is required for packing each grade of fruit. Thus the packing head 90 is detachably supported in the suspension frame 89, and the mechanism of the head to effect the contracting and expanding movement of the array of suction cups, is connected to the end of the piston rod of air cylinder 91 by a releasable head and socket coupling (not shown). There is also provided on the forward extension of the feed mechanism frame 21 a storage support 105 which is in horizontal alignment with the suspension frame 89 carrying the packing head. Thus when it is desired to move a packing station to another feed station, the packing heads 90 may be drawn forwardly out of the suspension frame 89 onto the storage support 105. The packing head is thereby retained with the appropriate feed station for subsequent fitment to the packing station when it is again moved into position with the particular feed station. Suitable automatic air line break-away connections are provided on the suspension frame 89 to co-operate with the packing head to supply the suction necessary for operating of the suction cups.

The operation of the apparatus will now be described on the basis that the mobile packing station is located in operative relation with one of the feed stations, and a full supply of fruit is in position in the feed races 22 and the chutes 40.

The apparatus is thus in the condition shown in FIGS. 2, 3 and 4 of the drawings.

Upon the operator initiating operation of the apparatus, the table 56 with the assembly plate 70 is drawn rearwardly by the air cylinder 102, to the position shown in broken outline in FIG. 2. The air cylinder 48 is then energized to pivot the chute frame 41 downwardly about the axis 42, so that the forward end of the chutes 40 are only slightly above the fingers 70a of the assembly plate. Upon the chute frame 41 reaching this position, the air cylinder 53 is energized to raise the stop frame 50 carrying the fingers 52. At the same time air cylinder 46 is energized to draw the carrier 44 and the lower chute frame 41 rearwardly. This raising of the stop fingers 52 and rearward movement of the chutes 40, permits the fruit in the chutes to roll therefrom onto the assembly plate, so that the fruit is deposited in the same row and layer formation on the assembly plate as it occupies in the chutes 50.

The table 56 and the assembly plate 70 with the layer of fruit supported thereon, is then moved forwardly by the air cylinder 62 to a position above the platform 76 of the packing station.

After the table 56 has been moved forward, and while the fruit thereon is being presented to the packing head, the chute frame 51 is raised by the air cylinder 48, and moved forward by the air cylinder 46 to re-occupy its original position as shown in full outline in FIG. 2. The stop frame 50 is also lowered so that the fingers 52 project into the lower end of the chutes 40, and the tube 54 is moved laterally to alternate the position of the stop fingers 52 relative to the chutes, to achieve the desired change in row formation in the next layer of fruit as previously described.

The stops 23 are now lowered to permit a further supply of fruit to flow from the feed races 22 into the chutes 40 as previously described, and then raised again. The feed control mechanism 25 then operates as previously described to allow more fruit to flow down the feed races 22.

After the table 56 with the assembled fruit thereon has been positioned by the air cylinder 102 below the packing head 90, the table is raised by the cylinders 78 to bring the layers of fruit into engagement with the array of suction cups on the packing heads 90. Suction is then provided to the cups from the vacuum pump 86 driven by the motor 85, so that the layer of fruit becomes attached to the cups. The detailed operation of the suction cups, including the manner in which the effective overall width of the layer of fruit is reduced after being attached to the suction cups, is described in detail in Australian Pat. Nos. 245,895 and 266,503, and shall therefore not be repeated here.

The table 56 and the assembly plate 70, now free of fruit, are again lowered by the air cylinder 78, onto the platform 76 and then moved rearwardly by the cylinder 102 to receive the next layer of fruit from the feed station.

While the transfer of the further layer of fruit is being effected, the fruit carton 80 is raised by the cylinder 77 to receive the packing head and the layers of fruit held thereby. When the fruit is disposed within the carton, either in an engagement with the bottom of the carton or with a previously deposited layer of fruit, the suction cups are isolated from the vacuum pump, in a manner described in the previously referred to prior patents, and the fruit thus released from the packing into the carton, in the required formation.

The carton is then returned to its lower position as shown in FIG. 3 and the cycle of operation repeated for the next layer of fruit by moving the table 56, which has received the next layer of fruit, forward again to the position above the platform and below the packing heads.

This cycle of operation is repeated until the required number of layers of fruit have been deposited into the cartons whereupon the cylinder 99 is energized to advance the cartons a distance equal to the length of one carton. The operation of the cylinder 99 pushes the carton containing the fruit forward onto the transfer conveyor 101, and positions the next carton for subsequent raising to receive layers of fruit from the packing head.

When the required number of cartons of fruit have been packed from one particular feed station, the apparatus is stopped by operating a master control with the assembly plate 70 and table 56 in the position shown in broken outline in FIG. 2. The air cylinder 58 is then operated to raise the arms 55 so that the table is suspended from the feed station frame 21, clear of the packing station frame 15. Also the packing heads 90 are moved forward out of the frame 89 into the suspended support 105, and the transfer conveyors 101 are raised clear of the discharge conveyor 100. The packing station is now in a condition to move to another feed station.

The transport control is now operated so that the trip 20 is disengaged from the cam 19a and the pins 16a disengaged from the aperture in the packing station frame and thereafter the motor 20 is energized to drive the pinion 19 so that the packing station moves in the required direction on the rails 12. As the packing station comes into correct relationship with the next feed station, the trip 20a will engage a further cam 19a to stop the packing station in the correct operative relation to the feed station. If it is desired to move the packing station more than one feed station in either direction, the transport control is operated each time the packing station stops at a successive feed station until the required feed station is reached.

It will be noted that the movement of all of the various components of the feed and packing stations are controlled in sequence and appropriate valves are arranged so the movement of one component to a particular position operates a valve to effect the next step in the sequence of operations. The position of these valves and the air lines connecting them to the appropriate cylinders have not been shown for the sake of maintaining the drawings simple, and it will be appreciated that any skilled person could mount the valves appropriately after having read the preceding description of the sequence of operations.

I claim:

1. A method of packing pieces of whole fruit in a container comprising delivering grade fruit to each one of a plurality of fruit feeding stations spaced along a predetermined path and each receiving fruit of one grade, moving a fruit packing station along said predetermined path to stop in cooperative relation at one of said fruit feeding stations, arranging the graded fruit at said fruit feeding station cooperating with said packing station in a predetermined row formation, transferring in succession a predetermined number of batches of fruit in said row formation from said cooperating feed station to said fruit packing station, forming each batch of fruit as received by said packing station into a predetermined layer formation, depositing successively a predetermined number of said layers of fruit by said fruit packing station into a container to fill at least one container, thereafter moving said fruit packing station along said predetermined path to stop in cooperative relation with another of said fruit feeding stations, and repeating the above steps at said other fruit feeding stations.

2. A method of packing pieces of whole fruit in a container comprising delivering graded fruit to a plurality of feed stations each receiving fruit of one grade, forming in sequence at each feed station successive layer of fruit of a predetermined formation, moving a packing station on a predetermined path to successively co-operate with each feed station, feeding successive layers of fruit independently to the packing station from the co-operating feed station, and independently depositing each layer of fruit received by the packing station into a container, the operation of the packing station and co-operating feed station being co-ordinated to deposit the required number and sequence of layers to fill the container.

3. A method of packing pieces of whole fruit in a container as claimed in claim 2 wherein the layer of fruit is formed by arranging the fruit into a number of feed rows corresponding to the number of rows in one layer in the container, separating from the respective feed rows the number of pieces of fruit in the corresponding row in the container, and forming said separated fruit into the same number of rows with the fruit in each alternate row staggered relative to the remaining rows a distance approximately half the diameter of one piece of fruit, and wherein the layer is fed to the packing station maintaining in said staggered row formation.

4. A method of packing pieces of whole fruit in a container, as claimed in claim 2 wherein while one layer of fruit is being deposited in the container the next layer is being fed from the co-operating feeding station to the packing station.

5. A method of packing pieces of whole fruit in a container as claimed in claim 2 wherein while one layer of fruit is being fed to the packing station the next layer is being formed in the co-operating feed station.

6. Apparatus for packing pieces of whole fruit in a container comprising a plurality of fruit feeding stations arranged to receive fruit of differing grades, each of said fruit feeding stations spaced along a predetermined path and including a feed mechanism operable to arrange the graded fruit in a predetermined row formation, and a mobile packing station mounted for controlled movement along said predetermined path to cooperate with one of said fruit feeding stations, fruit transfer means operable to deliver in succession batches of fruit from said feed mechanism in cooperating relationship with said packing station to said packing station to occupy a predetermined layer formation, means to deposit the required number of layers of fruit in the container and fill at least one container, and means for thereafter moving said packing station along said predetermined path to cooperate with another of said fruit feeding stations.

7. Apparatus for packing pieces of whole fruit in a container, comprising a plurality of feed stations arranged in a fixed formation to receive fruit of respective grades, and a mobile packing mechanism mounted for movement in a defined path to successively co-operate with each feed station, each feed station including a feed mechanism arranged to successively deliver predetermined quantities of fruit in a row formation to the co-operating packing station, said packing mechanism including transfer means operable to individually receive the quantity of fruit from the feed mechanism and deliver said fruit in a predetermined layer formation to a packing head, and means to deposit the layer from the packing head in a container in said formation.

8. Apparatus for packing pieces of whole fruit in a container as claimed in claim 7 wherein each feed mechanism comprises guide means to form the fruit into a plurality of independent rows, layer forming means to receive the predetermined number of pieces of fruit from the guide means and arrange said pieces of fruit in a desired layer formation, actuator means to effect controlled discharge of the fruit from the layer forming means to the transfer means in said layer formation, and stop means operable to regulate the delivery of fruit to the layer forming means in sequence with the discharge of the layer to the transfer means.

9. Apparatus as claimed in claim 8 wherein the transfer means is supported in the packing mechanism for movement between a position to receive the fruit from the feed mechanism and a position aligned with the packing head, and the feed mechanism includes layer forming means to receive said quantity of fruit and arrange the fruit in the layer formation, said layer forming means being supported for movement across the transfer means when the latter in the said receiving position to deliver the fruit thereto while maintaining the layer formation, and means to effect said movement of the transfer means and layer forming means in sequence.

10. Apparatus for packing pieces of whole fruit in a container, comprising a number of fruit feeding stations arranged in spaced relation to receive respective grades of fruit, each fruit feeding station including a storage hopper and a feed mechanism operable to form fruit flowing from the hopper into predetermined rows, and means to separate from said rows a predetermined number of pieces of fruit into a predetermined layer formation, and a mobile packing station mounted for controlled movement in a defined path to stop in sequence in co-operative relation at each feed station, the packing station including transfer means to receive the layer of fruit from the feed station and position said layer below a packing head adapted to support a layer of fruit in a suspended condition, means to deliver the layer of fruit positioned by transfer means to the packing head and means to present a container to the packing head and deposit the layer of fruit in the predetermined formation in the container, the packing station being physically and operationally interlocked with the co-operating feed station to deposit a number of layers of fruit in succession in the container to fill the container.

References Cited

UNITED STATES PATENTS

| | | | |
|---|---|---|---|
| 3,292,341 | 12/1966 | Frost | 53—165 X |
| 3,318,068 | 5/1967 | Youllaire | 53—164 |
| 3,453,802 | 7/1969 | Riddington | 53—165 X |
| 3,465,495 | 9/1969 | Zwiacher et al. | 53—247 X |
| 3,475,877 | 11/1969 | Fuller et al. | 53—164 X |

THERON E. CONDON, Primary Examiner

R. L. SPRUILL, Assistant Examiner

U.S. Cl. X.R.

53—35, 164, 244, 247

PO-1050
(5/69)

UNITED STATES PATENT OFFICE
CERTIFICATE OF CORRECTION

Patent No. 3,613,330        Dated October 19, 1971

Inventor(s) I. J. Voullaire

It is certified that error appears in the above-identified patent and that said Letters Patent are hereby corrected as shown below:

ASSIGNEE -- Voullaire Nominees Proprietary Limited, Monak, New South Wales, Australia -- .

Signed and sealed this 8th day of May 1973.

(SEAL)
Attest:

EDWARD M. FLETCHER, JR.
Attesting Officer

ROBERT GOTTSCHALK
Commissioner of Patents